Nov. 20, 1934.   M. VOGEL-JORGENSEN   1,981,235
BURNING OF CEMENT, ETC
Filed Sept. 9, 1932
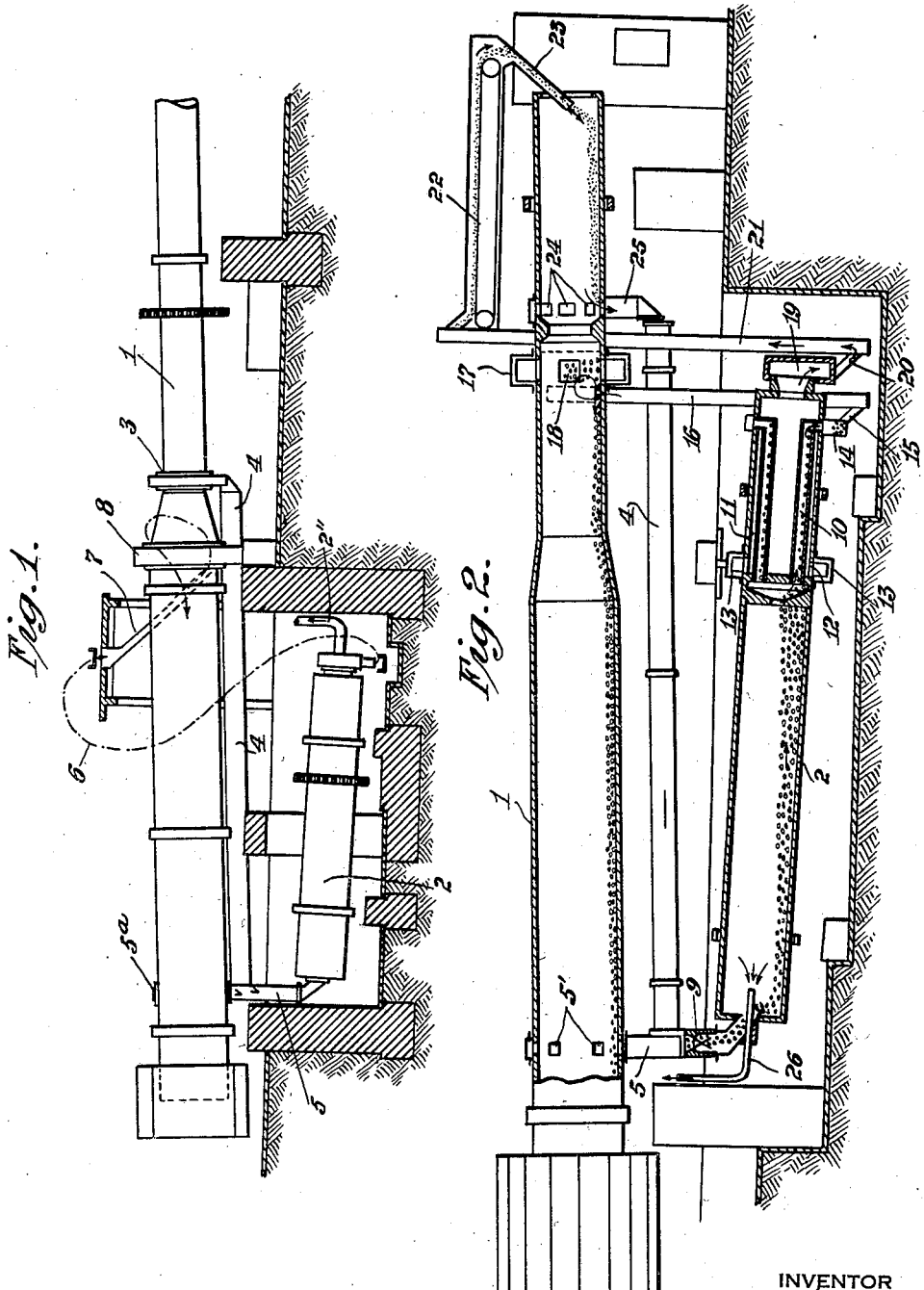
INVENTOR
Mikael Vogel-Jorgensen
BY
Redding, Greeley, O'Shea Campbell
ATTORNEYS Patented Nov. 20, 1934

1,981,235

UNITED STATES PATENT OFFICE 1,981,235

BURNING OF CEMENT, ETC.

Mikael Vogel-Jorgensen, Copenhagen, Denmark, assignor to F. L. Smidth & Co., New York, N. Y., a corporation of New Jersey Application September 9, 1932, Serial No. 632,301
In Great Britain November 16, 1931

3 Claims. (Cl. 222—7)

This invention relates to the burning of cement, lime, and like materials in rotary kilns with auxiliary devices. In such operations it is, as is well known, the calcination, i. e. the expelling of the carbonic acid of the raw material, which requires the larger part of the fuel consumption, and whatever is adapted to improve the fuel economy during calcination will, therefore, be of particular importance in relation to the total economy of the burning process.

The main object of this invention is to secure such improved economy by facilitating the transmission of heat from the products of combustion of the fuel to the raw material during the calcination of the same. Another object of the invention is to carry out the calcination in such a manner that the carbon dioxide driven off shall not be adulterated by products of combustion and shall therefore be available for industrial purposes which require pure carbon dioxide, as in the production of "dry ice".

The heat developed by the fuel in the calcining zone of the kiln has hitherto been transmitted to the raw material by allowing the products of combustion to sweep along the free surface of the raw material as the latter advances through the kiln,—a method of heat transmission which, however, is uneconomical because it requires a very great temperature difference between the products of combustion and the material as the heat of the products of combustion acts mainly on the surface of the material in the kiln and such surface is comparatively small.

According to the present invention cement, lime, or like material is burned in a rotary kiln with auxiliary devices, in such a way that the material to be burned or other heat-resistant, heat transmitting substance, such as fireclay, porcelain, etc., which has been heated to a temperature higher than the temperature required for calcination is used as a heat-transmitting medium between the products of combustion of the kiln and the raw material during the calcination of the latter, alternately receiving heat from the products of combustion and giving off heat to the raw material.

Also in accordance with the invention, the transmission of heat to the raw material to be calcined preferably takes place in a chamber separate from the kiln. The raw material thus wholly or partially calcined is reintroduced into the kiln at such a place that it can be completely burned therein.

That increased economy can be secured in this way is due chiefly to the fact that the transmission of heat from the hot bodies to the raw material takes place mainly by conduction.

The transmission of heat from the heated bodies to the raw material may take place in a chamber or chambers arranged around and rotating with the shell of the rotary kiln, or in a rotary chamber or chambers independent of the rotary kiln proper. As in both cases the heat exchanging chamber or chambers in question can be kept free from products of combustion, the carbon dioxide set free by the calcination can, as stated above, be recovered and utilized for different purposes, as for the production of fluid or solid carbonic acid, the so-called "dry ice".

The drawing shows two somewhat different types of kiln plants for performance of the process described herein, and each of Figures 1 and 2 are respectively views in elevation, partly in section, of the two embodiments.

In Figure 1, 1 is a rotary kiln which may be of ordinary construction, except as hereinafter indicated, and 2 is an independently rotating drum placed beneath the kiln and constituting the calcining chamber. The raw material introduced at the upper end of the kiln is dried and heated in the kiln and leaves the kiln, as at 3, through apertures in the wall enclosed by a casing, and is led thence through a conduit 4 with a suitable transport device and through a chute 5 at the lower end of the said conduit, and from this chute into the inlet end of the rotary drum 2. Through the chute 5 is also drawn from the kiln 1, through encased openings at 5ª, material which has been heated in the kiln to a temperature higher than the calcining temperature. This material is introduced into the calcining drum 2 together with the less heated raw material not yet calcined, and by the intimate mixing of the highly heated material and the less hot material during the passage through the drum, which may be inclined or provided with screw flights inside, the heat of the hot bodies is transmitted to the less hot material which is thereby calcined wholly or partially. From the outlet end of the drum 2 the material is re-introduced into the rotary kiln by suitable mechanical means which are sufficiently indicated by the broken line 6, being thereby elevated above the rotary kiln and then delivered through a chute 7 into a casing 8 encircling the kiln and enclosing apertures in the kiln wall through which the material is discharged into the kiln. Part of the material to be burned may thus circulate through the hottest zone of the rotary kiln, thence down into the calcining drum and thence again into the kiln. The carbonic acid driven off in the calcining drum 2 may either be led through the rotary kiln to the stack or it may be drawn out through a separate pipeline 2''.

The arrangement shown in Figure 2 is, in the main, similar to that shown in Figure 1, 1 indicating the rotary kiln and 2 the calcining drum placed beneath it and inclined in the opposite direction. 4 is a conduit to conduct raw material from the upper part of the kiln to the calcining drum, and 5 is a chute receiving highly heated material from the lower part of the kiln through encased apertures 5' in the rotary kiln wall and delivering it to the calcining drum. In this chute is arranged an air trap 9 which permits free passage of material from the kiln but prevents passage of gas or air from the drum into the kiln or vice versa. The lower end of the calcining drum is formed as a cooler having a number of tubes 10 arranged in a circle and having between these tubes and the wall of the drum a chamber 11, in which the raw meal is introduced through apertures 12 in the wall of the drum and a casing 13 surrounding these apertures. The tubes 10 are at their upper ends open toward the calcining drum 2 and the calcined material leaving the drum will, therefore, pass through them. The lower ends of the tubes 10 debouch into a casing 14 surrounding the drum, from which casing the material is led through a chute 15 to a lifting device 16 which will lift the material and, through a casing 17 enclosing the kiln shell, deliver the material to the kiln through apertures 18 in its wall. The raw material introduced through the casing 13 into the cooler of the calcining drum leaves the cooler through its end aperture 19 to which is connected a chute 20 debouching into a lifting device 21. By this the raw material preheated in the cooler is lifted and delivered to a belt conveyor 22 or transport device which discharges the material through a chute 23 into the upper end of the rotary kiln. Immediately preceding the apertures 18 this upper portion of the kiln has other apertures 24 surrounded by an outer casing from which a chute 25 delivers the heated raw material from the kiln into the upper end of the conduit 4.

The movement of the material through the apparatus shown in Figure 2 is as follows:

The raw material, which is supplied to the drum 2 through the casing 13, moves through the heat exchanger 10, 11 of the cooler portion of the calcining drum, is lifted by the elevator 21 to the belt conveyor 22, moves thence through the chute 23 into the upper end of the kiln, leaves this through the apertures 24, is led through the conduit 4, the chute 5 and the trap 9 into the upper end of the calcining drum, passes through this and its cooler section 10, 11, the casing 14 and the chute 15 to the elevator 16, is discharged from this through the apertures 18 of the kiln to the burning chamber of the kiln, passes through this chamber, and is, as to a portion at least, discharged therefrom through the apertures 5', after which it enters again the calcining drum through the chute 5, but now in a very hot state, i. e., with a temperature so much higher than the calcining temperature that the material can bring about the calcination of the already preheated raw material entering the drum 2 through the conduit 4. The material which does not leave the rotary kiln through the apertures 5' passes on through the kiln and leaves this through a clinker cooler of a known type.

At the upper end of the calcining drum a pipe 26 is connected for the discharge of the carbon dioxide set free by the calcination process in the drum 2. As the trap 9 is closed against the passage of the products of combustion streaming through the rotary kiln, and against the escape of carbon dioxide from the drum into the kiln the carbon dioxide developed in the drum can be kept free from products of combustion and led away to be used for industrial purposes.

It will be understood that the invention, so far as it resides in the improved process, is capable of realization in forms of apparatus other than those shown and suited to the materials treated and to the conditions of treatment, and that so far as it is embodied in apparatus various changes in details of construction and arrangement can be made to suit the conditions of operation.

I claim as my invention:

1. The process of burning cement raw material and the like, which comprises burning the material, subjecting to the products of combustion a heat-resistant, heat transmitting material, raising thereby the temperature of the heat-resistant, heat transmitting material to a temperature above that required for calcination of the material to be treated, mixing the heat transmitting material at such temperature with the material to be treated calcining the material to be treated by the transmission thereto of the heat of the heated transmitting material, and continuing the burning of the calcined material.

2. The process of burning cement raw material and the like, which comprises burning the material, subjecting to the products of combustion a heat-resistant, heat transmitting material, raising thereby the temperature of the heat-resistant, heat transmitting material to a temperature above that required for calcination of the material to be treated, calcining out of the path of the products of combustion the material to be treated by the transmission thereto of the heat of the heated transmitting material, and continuing the burning of the calcined material.

3. The process of burning cement raw material and the like, which comprises burning the material, subjecting to the products of combustion a heat-resistant, heat transmitting material, raising thereby the temperature of the heat-resistant, heat transmitting material to a temperature above that required for calcination of the material to be treated, calcining out of the path of the products of combustion the material to be treated by the transmission thereto of the heat of the heated transmitting material, continuing the burning of the calcined material, and recovering the carbon dioxide developed during the calcination of the material to be treated.

MIKAEL VOGEL-JORGENSEN.